US012031586B2

United States Patent
Fukushima et al.

(10) Patent No.: US 12,031,586 B2
(45) Date of Patent: Jul. 9, 2024

(54) METHOD FOR MANUFACTURING BEARING DEVICE FOR VEHICLE WHEEL

(71) Applicant: NTN Corporation, Osaka (JP)

(72) Inventors: Shigeaki Fukushima, Iwata (JP); Natsuko Nagai, Iwata (JP)

(73) Assignee: NTN CORPORATION, Osaka (JP)

( * ) Notice: Subject to any disclaimer, the term of this patent is extended or adjusted under 35 U.S.C. 154(b) by 268 days.

(21) Appl. No.: 17/424,226

(22) PCT Filed: Jan. 23, 2020

(86) PCT No.: PCT/JP2020/002240
§ 371 (c)(1),
(2) Date: Jul. 20, 2021

(87) PCT Pub. No.: WO2020/153417
PCT Pub. Date: Jul. 30, 2020

(65) Prior Publication Data
US 2022/0065290 A1    Mar. 3, 2022

(30) Foreign Application Priority Data
Jan. 25, 2019   (JP) .................. 2019-011474

(51) Int. Cl.
*F16C 43/04*     (2006.01)
*B60B 27/00*     (2006.01)
(Continued)

(52) U.S. Cl.
CPC ........ *F16C 43/045* (2013.01); *B60B 27/0073* (2013.01); *B60B 27/0094* (2013.01);
(Continued)

(58) Field of Classification Search
CPC .. F16C 19/186; F16C 43/045; F16C 2326/02; B60B 27/0073; B60B 27/0094; B60B 2320/10
See application file for complete search history.

(56) References Cited

U.S. PATENT DOCUMENTS

2014/0020250 A1*  1/2014  Labelle ................. F16C 41/008
427/256

FOREIGN PATENT DOCUMENTS

| JP | 2006-224902 | 8/2006 |
| JP | 2009-068581 | 4/2009 |

(Continued)

OTHER PUBLICATIONS

Machine Translation of JP-2009144739-A (Year: 2009).*
(Continued)

*Primary Examiner* — Alan B Waits
(74) *Attorney, Agent, or Firm* — Wenderoth, Lind & Ponack, L.L.P.

(57) ABSTRACT

A manufacturing method of a bearing device for a vehicle wheel (1) includes: a pressure adjusting step of enclosing, in a work chamber (Rw), the bearing device for a vehicle wheel (1) to which a sealing member (9) on an outer side is fitted in the work chamber (Rw), and adjusting a pressure in the work chamber (Rw) to a predetermined atmospheric pressure (Pt) according to an environment of a use area of the bearing device for a vehicle wheel (1); and a sealing step of fitting a cover (12) that seals an inner side opening (2a) of an outer ring (2) or an inner side sealing member (6) that seals between the outer ring (2) and a hub ring (3) or an inner ring (4) to the inner side opening (2a) in the work chamber (Rw) in which a pressure has been adjusted.

4 Claims, 9 Drawing Sheets

(51) Int. Cl.
*F16C 19/18* (2006.01)
*F16C 33/72* (2006.01)

(52) U.S. Cl.
CPC ........ *F16C 19/186* (2013.01); *B60B 2320/10* (2013.01); *F16C 33/723* (2013.01); *F16C 2326/02* (2013.01)

(56) References Cited

FOREIGN PATENT DOCUMENTS

| JP | 2009144739 A | * | 7/2009 | ............ F16C 33/726 |
|----|--------------|---|---------|--------------------------|
| JP | 2010-038250 |   | 2/2010 | |
| JP | 2013-213571 |   | 10/2013 | |
| JP | 2013213571 A | * | 10/2013 | ............ F16C 33/726 |
| JP | 2017-227301 |   | 12/2017 | |
| JP | 2019-173878 |   | 10/2019 | |

OTHER PUBLICATIONS

Machine Translation of JP-2013213571-A (Year: 2013).*
International Search Report issued Feb. 18, 2020 in International (PCT) Application No. PCT/JP2020/002240.

* cited by examiner

METHOD FOR MANUFACTURING BEARING DEVICE FOR VEHICLE WHEEL

TECHNICAL FIELD

The present invention relates to a manufacturing method of a bearing device for a vehicle wheel and a bearing device for a vehicle wheel.

BACKGROUND ART

Conventionally, a bearing device for a vehicle wheel that rotatably supports a wheel in a suspension device of an automobile or the like is known. For example, in the bearing device for a vehicle wheel, a hub ring which is an inner member connected to a wheel is rotatably supported by an outer member with a rolling body interposed between them. In the bearing device for a vehicle wheel, a seal member or the like is provided in a gap between the outer member and the inner member in order to prevent a foreign matter such as muddy water and dust from entering the inside of the outer member and the inner member to improve sealability.

In the bearing device for a vehicle wheel having such improved sealability, the atmospheric pressure inside the bearing changes due to a change in the external atmospheric pressure. For example, in a case where the bearing device for a vehicle wheel is used in a region lower in altitude than a region where the assembly is performed, the external atmospheric pressure becomes larger than the atmospheric pressure (pressure) inside the bearing. Further, in a case where the bearing device for a vehicle wheel is used in a region higher in altitude than a region where the assembly is performed, the external atmospheric pressure becomes smaller than the atmospheric pressure inside the bearing. For this reason, in the bearing device for a vehicle wheel, when the inside of the bearing has a negative pressure with respect to the atmospheric pressure due to an atmospheric pressure difference between a location of the bearing assembly and a use area, a seal lip of the seal member is attached to a sliding surface, and the rotational torque increases. In order to solve this problem, it is conceivable to employ a bearing device for a vehicle wheel in which a slidable piston is provided in the inner member and the volume inside the bearing changes according to pressure. For example, Patent Literature 1 describes such a configuration.

CITATIONS LIST

Patent Literature

Patent Literature 1: JP-A 2017-227301 Gazette

SUMMARY OF INVENTION

Technical Problems

In the bearing device for a vehicle wheel described in Patent Literature 1, a piston is slidably provided in an axial direction on an inner peripheral surface of a hub ring. Then, when the pressure inside the bearing changes due to a temperature change, the piston is displaced in the axial direction, so that the volume of a space inside the bearing changes. However, in such a bearing device for a vehicle wheel, since a piston slidable into the bearing is provided in the hub ring for pressure adjustment, the structure is complicated. Further, there has been possibility that muddy water or the like enters the inside of the bearing from a sliding portion of the piston.

The present invention has been made in view of the above circumstances, and an object of the present invention is to provide a manufacturing method of a bearing device for a vehicle wheel and a bearing device for a vehicle wheel capable of keeping a pressure difference between an atmospheric pressure inside a bearing and an atmospheric pressure in a use area within an allowable range without providing a mechanism for pressure adjustment in the bearing device for a vehicle wheel.

Solutions to Problems

A manufacturing method of a bearing device for a vehicle wheel according to the present invention is a manufacturing method of a bearing device for a vehicle wheel including an outer member having a plurality of rows of outer raceway surfaces formed on an inner periphery, an inner member on which a plurality of rows of inner raceway surfaces facing the plurality of rows of outer raceway surfaces are formed, a plurality of rows of rolling bodies rollably accommodated between both raceway surfaces of the outer member and the inner member, and a sealing member fitted into an opening portion on an outer side of the outer member and an opening portion on an inner side of the outer member. The manufacturing method includes a pressure adjusting step of enclosing, in a work chamber, the bearing device for a vehicle wheel to which one of the sealing member on an outer side and the sealing member on an inner side is fitted, the work chamber being provided for adjusting an atmospheric pressure in the chamber, and adjusting a pressure in the work chamber to a predetermined atmospheric pressure according to an environment of a use area of the bearing device for a vehicle wheel, and a sealing step of fitting the sealing member to an opening portion on a side where the sealing member is not fitted of the outer member in the work chamber in which a pressure has been adjusted.

In the manufacturing method of a bearing device for a vehicle wheel according to the present invention, in the pressure adjusting step, a pressure is adjusted after atmosphere in the work chamber is replaced with atmosphere having a predetermined composition.

In the manufacturing method of a bearing device for a vehicle wheel according to the present invention, in the pressure adjusting step, a pressure is adjusted after atmosphere in the work chamber is replaced with atmosphere having a predetermined humidity or with atmosphere that is composed to have a predetermined nitrogen concentration.

The manufacturing method of a bearing device for a vehicle wheel according to the present invention further includes a preliminary pressure adjusting step of, before the pressure adjusting step, using a front chamber communicating with the work chamber by adjusting an internal atmospheric pressure, enclosing the bearing device for a vehicle wheel in which one of the sealing member on an outer side and the sealing member on an inner side is fitted in the front chamber, and moving the bearing device for a vehicle wheel to the work chamber after a pressure in the front chamber is adjusted to the predetermined atmospheric pressure, and an atmosphere releasing step of, subsequent to the sealing step, using a rear chamber communicating with the work chamber by adjusting an internal atmospheric pressure, moving the bearing device for a vehicle wheel in the work chamber to the rear chamber after adjusting a pressure in the rear chamber to the predetermined atmospheric pressure, and releasing the rear chamber to atmosphere after enclosing the bearing device for a vehicle wheel in the rear chamber.

In the manufacturing method of a bearing device for a vehicle wheel according to the present invention, in the preliminary pressure adjusting step and the atmosphere releasing step, a pressure is adjusted after atmosphere of the front chamber and the rear chamber is replaced with atmosphere having a same composition as that of the work chamber.

A bearing device for a vehicle wheel according to the present invention includes an outer member having a plurality of rows of outer raceway surfaces formed on an inner periphery, an inner member on which a plurality of rows of inner raceway surfaces facing the plurality of rows of outer raceway surfaces are formed, a plurality of rows of rolling bodies rollably accommodated between both raceway surfaces of the outer member and the inner member, and a sealing member fitted into an opening portion on an outer side of the outer member and an opening portion on an inner side of the outer member. An atmospheric pressure inside the bearing device for a vehicle wheel is adjusted to a predetermined atmospheric pressure according to an environment of a use area of the bearing device for a vehicle wheel.

In the bearing device for a vehicle wheel according to the present invention, at least one of pieces of management information related to an atmospheric pressure inside the bearing device for a vehicle wheel and a composition of atmosphere inside the bearing device for a vehicle wheel is described on the outer member or the inner member.

Advantageous Effects of Invention

As advantageous effects of the present invention, effects described below are obtained.

According to the manufacturing method of a bearing device for a vehicle wheel of the present invention, the inner side opening portion of the bearing device for a vehicle wheel is sealed by the sealing member, in the work chamber in which a pressure is adjusted to a pressure based on an environment of the use area. Therefore, the atmospheric pressure inside the bearing is set to a predetermined atmospheric pressure based on the environment of the use area. In this manner, a pressure difference between the atmospheric pressure inside the bearing and the atmospheric pressure of the use area can be kept within an allowable range without providing a mechanism for pressure adjustment in the bearing device for a vehicle wheel.

According to the manufacturing method of the bearing device for a vehicle wheel of the present invention, the inner-side opening portion of the bearing device for a vehicle wheel is sealed by the sealing member, in the work chamber in which atmosphere has been replaced with atmosphere having a predetermined composition and state. Therefore, a space inside the bearing is filled with the atmosphere having the predetermined composition and state. In this manner, an atmosphere state inside the bearing is stabilized, and a pressure difference between the atmospheric pressure inside the bearing and the atmospheric pressure of the use area can be kept within an allowable range.

According to the manufacturing method of the bearing device for a vehicle wheel of the present invention, the bearing device for a vehicle wheel is moved from the front chamber in which a pressure has been adjusted to the work chamber in which a pressure has been adjusted, and the bearing device for a vehicle wheel is moved from the work chamber in which the pressure has been adjusted to the rear chamber in which a pressure has been adjusted, so that the pressure and the composition of the atmosphere in the work chamber do not change when the bearing device for a vehicle wheel is loaded and unloaded. In this manner, management of an atmospheric pressure and an atmosphere state inside the bearing of the bearing device for a vehicle wheel is facilitated, and a pressure difference between the atmospheric pressure inside the bearing and the atmospheric pressure of the use area can be kept within an allowable range.

According to the bearing device for a vehicle wheel of the present invention, the bearing device for a vehicle wheel is sealed by the sealing member so that the atmospheric pressure inside the bearing is maintained at a predetermined atmospheric pressure based on the environment of the use area. In this manner, a pressure difference between the atmospheric pressure inside the bearing and the atmospheric pressure of the use area can be maintained within an allowable range without providing a mechanism for pressure adjustment in the bearing device for a vehicle wheel.

According to the bearing device for a vehicle wheel of the present invention, since the composition and state of the atmosphere inside the bearing can be easily checked from the outside of the bearing, it is possible to reliably select the bearing device for a vehicle wheel adjusted to the internal atmosphere according to a use environment. In this manner, management of an atmospheric pressure and an atmosphere state inside the bearing of the bearing device for a vehicle wheel is facilitated, and a pressure difference between the atmospheric pressure inside the bearing and the atmospheric pressure of the use area can be maintained within an allowable range.

DESCRIPTION OF EMBODIMENTS

Hereinafter, a bearing device for a vehicle wheel 1 which is a first embodiment of a bearing device for a vehicle wheel according to the present invention will be described with reference to FIGS. 1 and 2.

Figure 1:
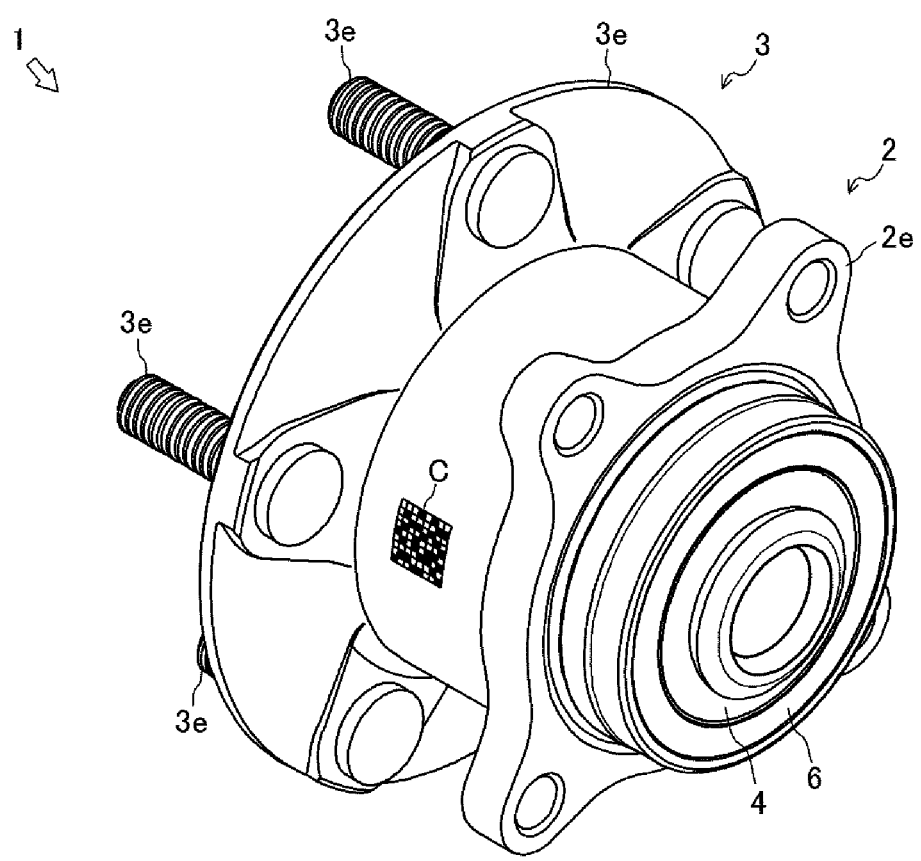
FIG. 1 is a perspective view showing an entire configuration of a bearing device for a vehicle wheel according to a first embodiment.
Figure 2:
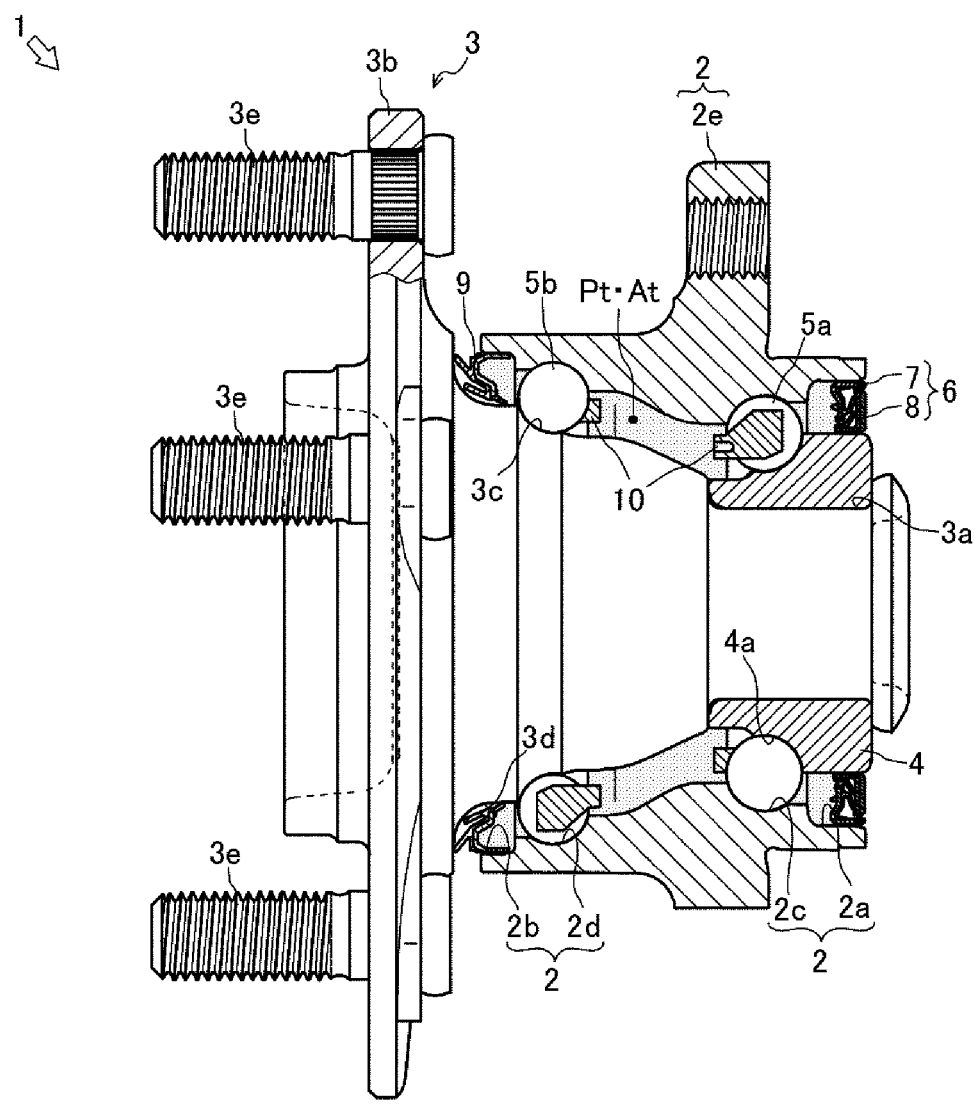
FIG. 2 is a cross-sectional view showing the entire configuration of the bearing device for a vehicle wheel according to the first embodiment.

As illustrated in FIGS. 1 and 2, the bearing device for a vehicle wheel 1 rotatably supports a wheel in a suspension device of a vehicle such as an automobile. The bearing device for a vehicle wheel 1 includes an outer ring 2 that is an outer member, a hub ring 3 that is an inner member, an inner ring 4, two rows of inner-side ball rows 5*a* (see FIG. 2) that are rolling rows, an outer-side ball row 5*b* (see FIG. 2), an inner-side seal member 6 (see FIG. 2), and an outer-side seal member 9 (see FIG. 2). Here, "inner side" represents the vehicle body side of the bearing device for a vehicle wheel 1 when attached to a vehicle body, and "outer side" represents the wheel side of the bearing device for a vehicle wheel 1 when attached to the vehicle body. Further, the axial direction represents a direction along a rotation axis of the bearing device for a vehicle wheel 1.

As shown in FIG. 2, the outer ring 2 is made from medium-high carbon steel containing 0.40 wt % to 0.80 wt % of carbon such as S53C. An inner-side opening portion 2*a* into which the inner-side seal member 6 can be fitted is formed in an inner-side end portion of the outer ring 2. An outer-side opening portion 2*b* into which the outer-side seal member 9 can be fitted is formed in an outer-side end portion of the outer ring 2. An outer raceway surface 2*c* on the inner side formed in an annular shape and an outer raceway surface 2*d* on the outer side are formed on the inner peripheral surface of the outer ring 2. A layer hardened by, for example, induction hardening and having a surface hardness in a range of 58 to 64 HRC is formed on the outer raceway surface 2*c* on the inner side and the outer raceway surface 2*d* on the outer side. A vehicle body mounting flange 2*e* for mounting on a member (knuckle) on the vehicle body side (not shown) is integrally formed on the outer peripheral surface of the outer ring 2.

The hub ring 3 is made from medium-high carbon steel containing 0.40 wt % to 0.80 wt % of carbon such as S53C. In an inner-side end portion of the hub ring 3, a small diameter step portion 3*a* whose diameter is smaller than that of an outer-side end portion is formed on the outer peripheral surface. A vehicle wheel mounting flange 3*b* for mounting a wheel is integrally formed in an outer-side end portion of the hub ring 3. The vehicle wheel mounting flange 3*b* is provided with a plurality of hub bolts 3*e* at positions at circumferentially equal intervals. Further, the hub ring 3 is provided with an inner raceway surface 3*c* on the outer side in a manner facing the outer raceway surface 2*d* on the outer side of the outer ring 2. Further, on the hub ring 3, a lip sliding surface 3*d* of the outer-side seal member 9 is formed on the base portion side of the vehicle wheel mounting flange 3*b*. The hub ring 3 is provided with the inner ring 4 in the small diameter step portion 3*a*.

The inner ring 4 applies preload to the inner-side ball row 5*a* that is a rolling row and is arranged on the vehicle body side when the inner ring 4 is mounted on a vehicle and the outer-side ball row 5*b* arranged on the wheel side when the inner ring 4 is mounted on a vehicle. The inner ring 4 is made from high carbon chromium bearing steel such as SUJ2, for example, and is hardened, by immersion quenching, in a range of 58 to 64 HRC down to a core portion. An annular inner raceway surface 4*a* is formed in the circumferential direction on the outer peripheral surface of the inner ring 4. The inner ring 4 is fixed to the small diameter step portion 3*a* of the hub ring 3 by press-fitting and caulking. That is, the inner ring 4 forms the inner raceway surface 4*a* on the inner side of the hub ring 3. In the hub ring 3, the inner raceway surface 4*a* of the inner ring 4 in an inner-side end portion faces the outer raceway surface 2*c* on the inner side of the outer ring 2.

In the inner-side ball row 5*a* and the outer-side ball row 5*b*, which are rolling rows, a plurality of balls 5, which are rolling bodies, are annularly held by a cage 10. The inner-side ball row 5*a* and the outer-side ball row 5*b* are made from high carbon chromium bearing steel such as SUJ2, for example, and are hardened, by immersion quenching, in a range of 62 to 67 HRC down to a core portion. The inner-side ball row 5*a* is rollably sandwiched between the inner raceway surface 4*a* of the inner ring 4 and the outer raceway surface 2*c* on the inner side of the outer ring 2. The outer-side ball row 5*b* is rollably sandwiched between the inner raceway surface 3*c* of the hub ring 3 and the outer raceway surface 2*d* on the outer side of the outer ring 2.

In the bearing device for a vehicle wheel 1, the outer ring 2, the hub ring 3 and the inner ring 4, the inner-side ball row 5*a*, and the outer-side ball row 5*b* constitute a double row angular contact ball bearing. Note that, in the present embodiment, the bearing device for a vehicle wheel 1, which includes the double row angular contact ball bearing, may include a bearing such as a double row tapered roller bearing. Note that, in the present embodiment, the pitch circle diameter of the outer-side ball row 5*b* is larger than the pitch circle diameter of the inner-side ball row 5*a*. However, the present invention is not limited to this.

The inner-side seal member 6, which is a sealing member, is a pack seal that blocks a gap between the inner-side opening portion 2*a* of the outer ring 2 and the inner ring 4. The inner-side seal member 6 includes, for example, a pack seal with an encoder of a two-side lip type in which two seal lips are brought into contact with each other. The inner-side seal member 6 includes a substantially cylindrical seal plate 7 and a substantially cylindrical slinger 8.

The seal plate 7 includes core metal and a seal lip. The core metal is made from metal, and composed of, for example, a ferritic stainless steel plate (JIS standard SUS430 series or the like), an austenitic stainless steel plate (JIS standard SUS304 series or the like), or a rust-proof cold rolled steel plate (JIS standard SPCC series or the like). In the core metal, an outer edge portion of an annular steel plate is bent by press working, and is formed in a substantially L shape in an axial cross-sectional view. The seal plate 7 is fitted and fixed to the inner-side opening portion 2*a* of the outer ring 2.

A plurality of seal lips are bonded to an inner side surface of the seal plate 7 by vulcanization, for example. A plurality of the seal lips are made from, for example, synthetic rubber such as acrylonitrile-butadiene rubber (NBR), hydrogenated acrylonitrile-butadiene rubber (HNBR) excellent in heat resistance, ethylene propylene rubber (EPDM), polyacrylic rubber (ACM) excellent in heat resistance and chemical resistance, fluororubber (FKM), or silicone rubber.

The slinger 8 is composed of, for example, a steel plate equivalent to the seal plate 7. In the slinger 8, an outer edge portion and an inner edge portion of an annular steel plate is bent by press working, and is formed in a substantially L shape in an axial cross-sectional view. The slinger 8 is fitted and fixed to the inner ring 4 on the inner side than the seal plate 7. At this time, the slinger 8 is disposed to face the seal plate 7 in the axial direction. As described above, the inner-side seal member 6 is disposed such that the seal plate 7 fitted to the inner-side opening portion 2a of the outer ring 2 and the slinger 8 fitted to the inner ring 4 face each other, and constitutes a pack seal.

A plurality of the seal lips of the seal plate 7 are in contact with or close to the slinger 8, which is a sliding surface, with an oil film of grease interposed between them to prevent leakage of grease inside the bearing device for a vehicle wheel 1 to the outside and prevent entry of muddy water, dust, and the like from the outside of the bearing device for a vehicle wheel 1 to the inside. In this manner, the inner-side seal member 6 prevents leakage of lubricating grease from the inner-side opening portion 2a of the outer ring 2 and entry of rainwater, dust, or the like from the outside.

The outer-side seal member 9, which is a sealing member, is a seal member that mainly blocks a gap between the outer ring 2 and the hub ring 3. In the outer-side seal member 9, for example, a plurality of seal lips made from synthetic rubber such as acrylonitrile-butadiene rubber (NBR) are bonded by vulcanization to core metal in which a metal plate equivalent to the seal plate 7 of the inner-side seal member 6 is formed in a substantially cylindrical shape. The outer-side seal member 9 is configured to be slidable with respect to the hub ring 3 in a manner that a cylindrical portion is fitted to the outer-side opening portion 2b of the outer ring 2 and a plurality of seal lips are brought into contact with or close to the lip sliding surface 3d of the hub ring 3 with an oil film interposed between the plurality of seal lips and the lip sliding surface 3d.

In the bearing device for a vehicle wheel 1, a space (hereinafter, simply referred to as "inside the bearing") between the outer member including the outer ring 2 and the inner member including the hub ring 3 and the inner ring 4 is sealed by the inner-side seal member 6 and the outer-side seal member 9. When the bearing device for a vehicle wheel 1 is sealed by the fitting of the inner-side seal member 6, atmosphere A inside the bearing is replaced with atmosphere At having a predetermined composition, and an atmospheric pressure P inside the bearing is adjusted to a predetermined atmospheric pressure Pt according to an environment of the use area (area where the device is used). The bearing device for a vehicle wheel 1 is sealed by the inner-side seal member 6 and the outer-side seal member 9, so that the atmospheric pressure P inside the bearing is maintained at the predetermined atmospheric pressure Pt according to the environment of the use area.

The "predetermined atmospheric pressure Pt according to the environment of the use area" (hereinafter, simply referred to as "predetermined atmospheric pressure Pt") in the bearing device for a vehicle wheel 1 refers to atmospheric pressure at which, in a case where an atmospheric pressure Pa in the area where the bearing device for a vehicle wheel 1 is assembled and an atmospheric pressure Pu in the use area of the bearing device for a vehicle wheel 1 are different, the sealability of the inner-side seal member 6 and the outer-side seal member 9 does not deteriorate or the rotational resistance of the hub ring 3 (inner ring 4) does not increase due to the pressure difference between the atmospheric pressure P inside the bearing and the atmospheric pressure Pu in the use area. Further, the predetermined atmospheric pressure Pt also takes into account a pressure difference due to a volume change of gas caused by a temperature difference between a temperature of an assembled area and a temperature of the use area. The predetermined atmospheric pressure Pt is desirably set to be slightly positive pressure with respect to the atmospheric pressure Pu in the use area.

Next, a bearing device for a vehicle wheel 11 as a second embodiment of the bearing device for a vehicle wheel according to the present invention will be described with reference to FIG. 3. Note that the bearing device for a vehicle wheel 11 according to the embodiments below is applied in place of the bearing device for a vehicle wheel 1 in the bearing device for a vehicle wheel 1 illustrated in FIGS. 1 and 2, and names, figure numbers, and reference numerals used in the description are used to indicate the same components. In the embodiments below, a specific description of the same points as those of the previously described embodiment will be omitted, and differences will be mainly described.

The bearing device for a vehicle wheel 11 includes the outer ring 2 that is the outer member, the hub ring 3 that is the inner member, the inner ring 4, two rows of the inner-side ball rows 5a (see FIG. 2) that are rolling rows, the outer-side ball row 5b (see FIG. 2), a cover 12, an annular inner-side seal member 13 provided on the cover 12, and the outer-side seal member 9 (see FIG. 2).

Figure 3:
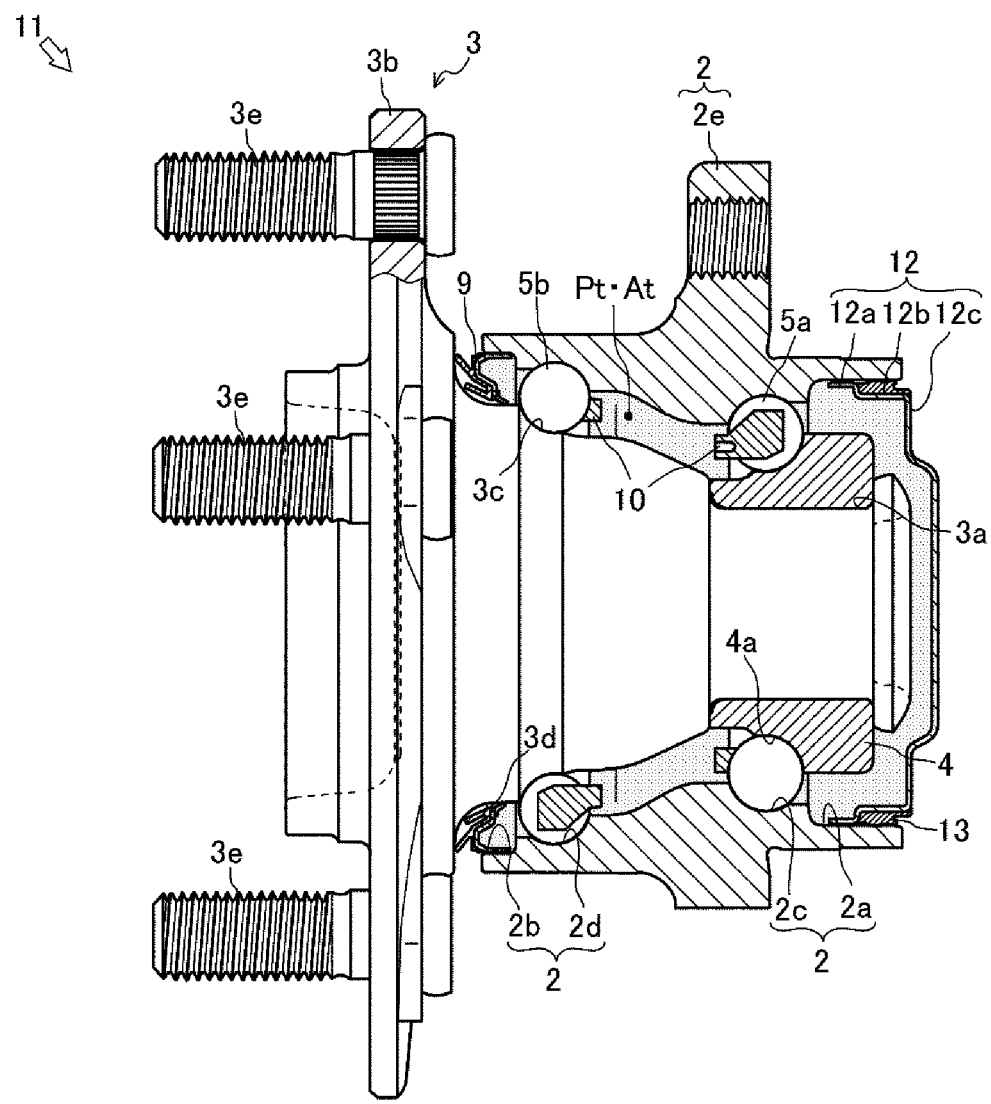
FIG. 3 is a cross-sectional view showing the entire configuration of the bearing device for a vehicle wheel according to the first embodiment.

As illustrated in FIG. 3, the cover 12 which is a sealing member blocks the inner-side opening portion 2a of the outer ring 2 to prevent entry of a foreign matter such as muddy water from the outside. The cover 12 is formed in a bottomed cylindrical shape by press working. The cover 12 is composed of, for example, a ferritic stainless steel plate (JIS standard SUS430 series or the like), an austenitic stainless steel plate (JIS standard SUS304 series or the like), or a rust-proof cold rolled steel plate (JIS standard SPCC series or the like). In the cover 12, a fitting portion 12a, a seal support portion 12b, and a bottom portion 12c are integrally connected.

In a cylindrical portion of the cover 12, the fitting portion 12a and the seal support portion 12b are formed on the same axis. The fitting portion 12a is formed in an opening side end portion of the cover 12. The fitting portion 12a is formed to have an outer diameter larger than an inner diameter of the inner-side opening portion 2a of the outer ring 2. The fitting portion 12a has an outer diameter and an axial length that can be press-fitted into the inner-side opening portion 2a. The fitting portion 12a is fitted into the inner-side opening portion 2a of the outer ring 2.

The seal support portion 12b supports the inner-side seal member 13. The seal support portion 12b is disposed adjacent to the inner side of the fitting portion 12a. The seal support portion 12b is formed to have an outer diameter smaller than that of the fitting portion 12a. In this manner, the seal support portion 12b forms a space in which the inner-side seal member 13 can be disposed between the seal support portion 12b and the inner peripheral surface of the inner-side opening portion 2a. The bottom portion 12c is formed on the inner side of the seal support portion 12b. The bottom portion 12c covers the inner-side opening portion 2a of the outer ring 2.

The annular inner-side seal member 13 blocks a gap between the outer ring 2 and the cover 12. The inner-side seal member 13 is fixed to the outer peripheral surface of the seal support portion 12b of the cover 12 by, for example, vulcanization adhesion. That is, the inner-side seal member 13 is provided so as to be adjacent to the fitting portion 12a. The inner-side seal member 13 is made from, for example, synthetic rubber such as acrylonitrile-butadiene rubber (NBR), hydrogenated acrylonitrile-butadiene rubber (HNBR) excellent in heat resistance, ethylene propylene rubber (EPDM), polyacrylic rubber (ACM) excellent in heat resistance and chemical resistance, fluororubber (FKM), or silicone rubber.

The inner-side seal member 13 is formed to have an outer diameter larger than an inner diameter of the inner-side opening portion 2a of the outer ring 2. The inner-side seal member 13 protrudes radially outward than the fitting portion 12a of the cover 12. The inner-side seal member 13 is configured to be in close contact with the inner peripheral surface of the inner-side opening portion 2a when the fitting portion 12a is fitted to the inner-side opening portion 2a of the outer ring 2. The inner-side seal member 13 is elastically deformed and crimped to the inner-side opening portion 2a to block a gap between the outer ring 2 and the cover 12.

In the bearing device for a vehicle wheel 11, a space inside the bearing is sealed by the outer-side seal member 9, the cover 12, and the inner-side seal member 13. When the bearing device for a vehicle wheel 11 is sealed by the fitting of the cover 12 and the inner-side seal member 13, the atmosphere A inside the bearing is replaced with the atmosphere At having a predetermined composition, and the atmospheric pressure P inside the bearing is adjusted to the predetermined atmospheric pressure Pt according to an environment of the use area. The bearing device for a vehicle wheel 11 is sealed by the cover 12, the inner-side seal member 13, and the outer-side seal member 9, so that the atmospheric pressure inside the bearing is maintained at the predetermined atmospheric pressure Pt according to the environment of the use area. Further, in the bearing devices for a vehicle wheel 1 and 11, management information of atmosphere including a composition of the atmosphere At inside the bearing, a value of the atmospheric pressure Pt of the atmosphere At, and the like is printed as a two-dimensional code C by a laser or the like in a location visible from the outside, such as the outer peripheral surface of the outer ring 2 (see FIG. 1). On the bearing devices for a vehicle wheel 1 and 11, the management information of atmosphere inside the bearing, which is difficult to check by reading the two-dimensional code C, can be checked from outside the bearing.

Next, a manufacturing method of the bearing device for a vehicle wheel 1 will be described with reference to FIGS. 4 to 8. It is assumed that, in the description of the present manufacturing method, the bearing device for a vehicle wheel 1 is the bearing device for a vehicle wheel 1 according to the first embodiment, and is assembled in a state where the hub ring 3 and the inner ring 4 are rotatably supported by the outer ring 2 via the inner-side ball row 5a and the outer-side ball row 5b by a publicly-known manufacturing method. Furthermore, it is assumed that the outer-side seal member 9 is incorporated in the outer-side opening portion 2b of the outer ring 2. In contrast, it is assumed that the inner-side seal member 6 is not incorporated in the inner-side opening portion 2a of the outer ring 2. That is, in the bearing device for a vehicle wheel 1, only the outer-side opening portion 2b is sealed by the outer-side seal member 9, and the inner-side opening portion 2a is released. Through a preliminary pressure adjusting step, a pressure adjusting step, a sealing step, and an atmosphere releasing step in the manufacturing method, assembly of the bearing device for a vehicle wheel 1 is completed. Note that the present manufacturing method is also applicable to the bearing device for a vehicle wheel 11 (see FIG. 3).

Figure 4:
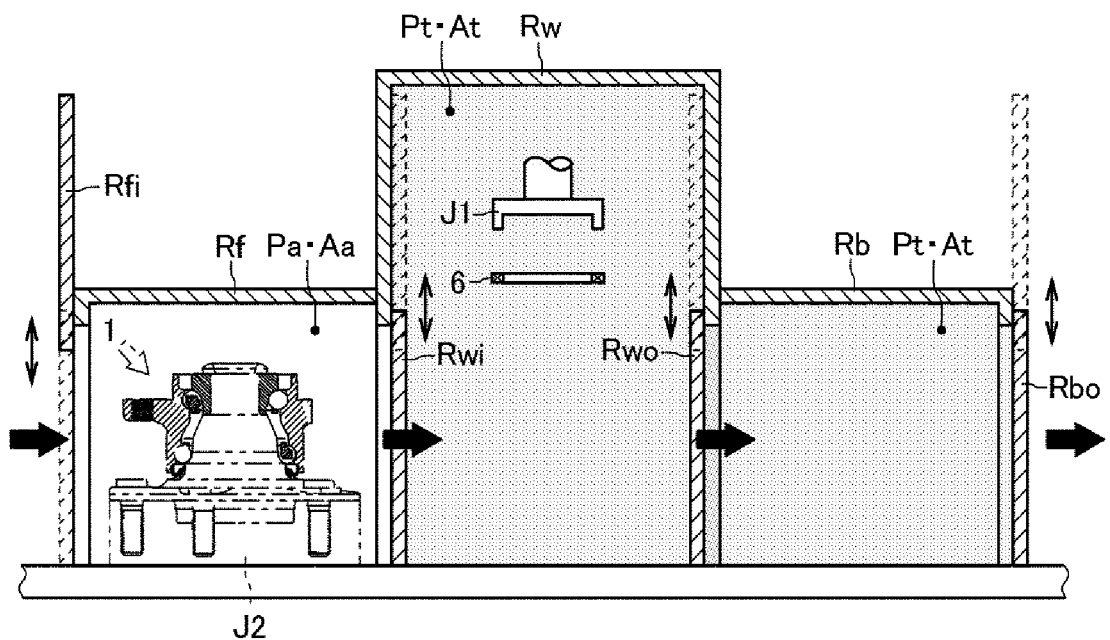
FIG. 4 is a schematic cross-sectional view showing an entire configuration of a device for manufacturing a bearing device for a vehicle wheel.

As shown in FIG. 4, a device for manufacturing that is used in the preliminary pressure adjusting step, the pressure adjusting step, the sealing step, and the atmosphere releasing step in the manufacturing method of the bearing device for a vehicle wheel 1 includes a work chamber Rw, a front chamber Rf, and a rear chamber Rb. In the present embodiment, the bearing device for a vehicle wheel 1 is assembled, by the steps in the device for manufacturing, such that the atmosphere A inside the bearing is the atmosphere At having a predetermined composition (for example, atmosphere of 100% nitrogen), and the atmospheric pressure P inside the bearing is the predetermined atmospheric pressure Pt (for example, 1.1 atm) slightly (for example, 0.1 atm) higher than the atmospheric pressure Pa (for example, 1.0 atm) of the area where the bearing device for a vehicle wheel 1 is assembled. Note that the atmosphere At having a predetermined composition may be not only the atmosphere of 100% nitrogen, but also atmosphere in a desired state according to the environment in which the bearing device for a vehicle wheel 1 is used, such as atmosphere in an absolutely dry state (humidity of 1% or less).

The work chamber Rw is a housing constituting a work space in which the inner-side seal member 6 is fitted to the bearing device for a vehicle wheel 1. The work chamber Rw is provided with a charge portion Rwi and a discharge portion Rwo, which are openable and closable. The work chamber Rw can form a sealed work space as the charge portion Rwi and the discharge portion Rwo are in a closed state. Further, inside the work chamber Rw, a seal member press-fitting jig J1 movable in the axial direction of the bearing device for a vehicle wheel 1 and a seal member supply device (not shown) are provided. In the work chamber Rw, the inner-side seal member 6 supplied from the seal member supply device (not shown) in the work space can be fitted to the bearing device for a vehicle wheel 1 by the seal member press-fitting jig J1. The work chamber Rw can replace atmosphere in the chamber with the atmosphere At having a predetermined composition in the sealed work space and adjust the pressure to the predetermined atmospheric pressure Pt. The work chamber Rw is configured as a main chamber in which predetermined work is performed under a predetermined environment.

The front chamber Rf is a housing constituting a space filled with atmosphere in the same state as that in the inside of the work chamber Rw around the charge portion Rwi of the work chamber Rw. The front chamber Rf is provided so as to cover the charge portion Rwi of the work chamber Rw. That is, the front chamber Rf communicates with the work chamber Rw via the charge portion Rwi. The front chamber Rf is provided with an openable and closable front chamber charge portion Rfi. Further, in the front chamber Rf, the charge portion Rwi of the work chamber Rw also serves as a discharge portion of the front chamber Rf. The front chamber Rf can form a sealed space as the front chamber charge portion Rfi and the charge portion Rwi of the work chamber Rw are closed. Further, the pressure in the sealed front chamber Rf can be adjusted to the predetermined atmospheric pressure Pt, and the atmosphere in the chamber can be replaced with the atmosphere At having a predetermined composition. As described above, the front chamber Rf is disposed on the upstream side of the work chamber Rw, and is configured as an upstream side pressure adjusting chamber for keeping the environment inside the work chamber Rw constant when the bearing device for a vehicle wheel 1 is put into the work chamber Rw.

The rear chamber Rb is a housing constituting a space filled with atmosphere in the same state as that in the inside of the work chamber Rw around the discharge portion Rwo of the work chamber Rw. The rear chamber Rb is provided so as to cover the discharge portion Rwo of the work chamber Rw. That is, the rear chamber Rb communicates with the work chamber Rw via the discharge portion Rwo. The rear chamber Rb is provided with an openable and closable rear chamber discharge portion Rbo. Further, in the rear chamber Rb, the discharge portion Rwo of the work chamber Rw also serves as the charge portion Rwi of the rear chamber Rb. The rear chamber Rb can form a sealed space as the discharge portion Rwo of the work chamber Rw and the rear chamber discharge portion Rbo are closed. Further, the pressure in the rear chamber Rb can be adjusted to the predetermined atmospheric pressure Pt, and the atmosphere in the chamber can be replaced with the atmosphere At having a predetermined composition. As described above, the rear chamber Rb is disposed on the downstream side of the work chamber Rw, and is configured as a downstream side pressure adjusting chamber for keeping the environment inside the work chamber Rw constant when the bearing device for a vehicle wheel 1 is discharged from the work chamber Rw.

In the manufacturing method of the bearing device for a vehicle wheel 1, the front chamber Rf has the front chamber charge portion Rfi opened. The inside of the front chamber Rf is in a state where atmosphere Aa, which is the atmosphere in the area where the bearing device for a vehicle wheel 1 is assembled, is filled with the atmospheric pressure Pa. The work chamber Rw is sealed with the charge portion Rwi and the discharge portion Rwo closed. Similarly, the rear chamber Rb of the work device is sealed with the rear chamber discharge portion Rbo closed. Further, the atmosphere inside of the work chamber Rw and the rear chamber Rb is replaced with the atmosphere At having a predetermined composition (nitrogen 100%). Furthermore, the pressure in the work chamber Rw and the rear chamber Rb is adjusted to the predetermined atmospheric pressure Pt (1.1 atm) (see a shaded portion). The bearing device for a vehicle wheel 1 is held by a holder J2 with outer-side end facing downward in the vertical direction. That is, the bearing device for a vehicle wheel 1 is held by the holder J2 with the inner-side opening portion 2a facing upward.

Figure 5:
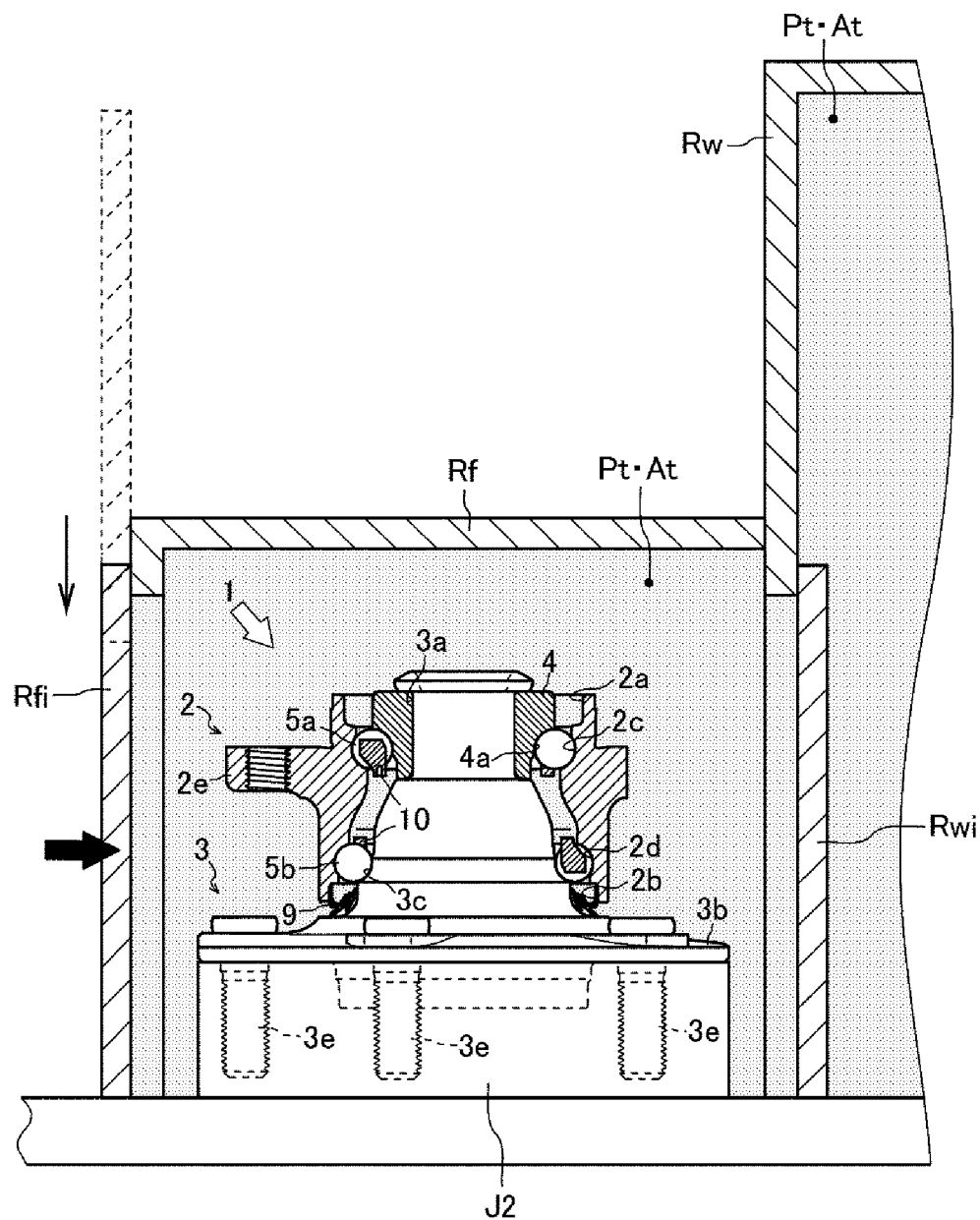
FIG. 5 is a schematic cross-sectional view showing a state in which a bearing device for a vehicle wheel is sealed in a front chamber in the device for manufacturing the bearing device for a vehicle wheel.

As shown in FIG. 5, the preliminary pressure adjusting step in the manufacturing method of the bearing device for a vehicle wheel 1 is a step of replacing the atmosphere and adjusting the pressure in the front chamber Rf in which the bearing device for a vehicle wheel 1 is sealed. In the preliminary pressure adjusting step, the bearing device for a vehicle wheel 1 is moved from the front chamber charge portion Rfi of the front chamber Rf into the front chamber Rf while being held by the holder J2 (see a thick black arrow). The bearing device for a vehicle wheel 1 is enclosed in the front chamber Rf as the front chamber charge portion Rfi is closed (see an arrow).

The atmosphere in the front chamber Rf in which the bearing device for a vehicle wheel 1 is sealed is replaced with the atmosphere At having a predetermined composition. The front chamber Rf having the atmosphere replaced with the atmosphere At having a predetermined composition has the pressure adjusted to the predetermined atmospheric pressure Pt (see a shaded portion). When the pressure adjustment is completed, the front chamber Rf communicates with the work chamber Rw as the charge portion Rwi of the work chamber Rw is opened (see FIG. 6). At this time, since the composition of the atmosphere and the atmospheric pressure in the work chamber Rw are equal to the composition of the atmosphere and the atmospheric pressure in the front chamber Rf, the composition of the atmosphere and the atmospheric pressure in the work chamber Rw do not change even if the charge portion Rwi is opened.

Figure 6:
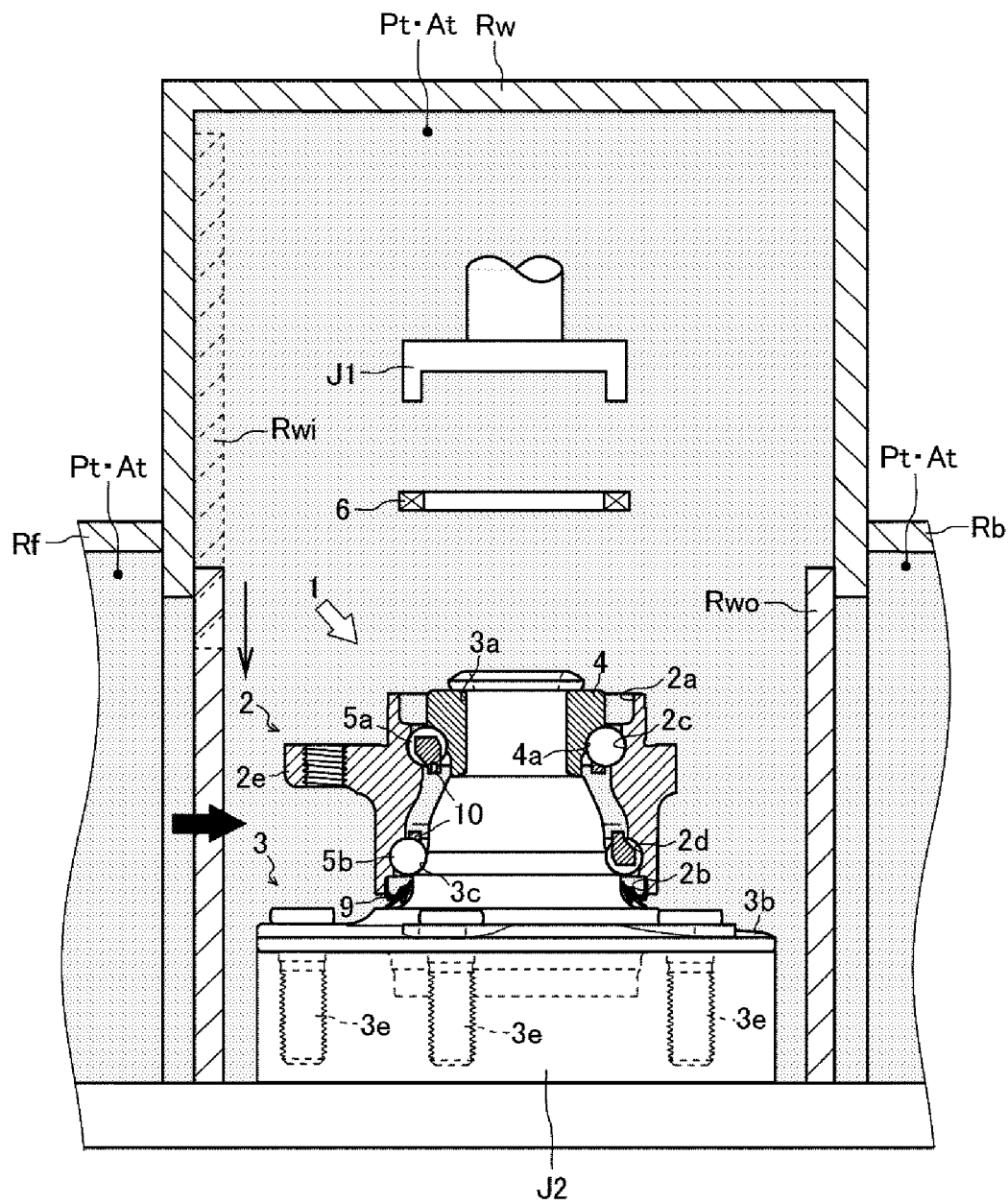
FIG. 6 is a schematic cross-sectional view showing a state in which a bearing device for a vehicle wheel is moved from the front chamber to a work chamber in the device for manufacturing the bearing device for a vehicle wheel.

As shown in FIG. 6, the pressure adjusting step in the manufacturing method of the bearing device for a vehicle wheel 1 is a step of replacing the atmosphere and adjusting the pressure in the work chamber Rw in which the bearing device for a vehicle wheel 1 is enclosed. In the pressure adjusting step, the bearing device for a vehicle wheel 1 is moved from the charge portion Rwi of the work chamber Rw into the work chamber Rw while being held by the holder J2 (see a thick black arrow). The bearing device for a vehicle wheel 1 is enclosed in the work chamber Rw as the charge portion Rwi is closed (see an arrow). The work chamber Rw has the atmosphere replaced with the atmosphere At having a predetermined composition and the pressure adjusted to the predetermined atmospheric pressure Pt in advance (see a shaded portion). That is, at a time point at which the bearing device for a vehicle wheel 1 is enclosed in the work chamber Rw, the atmosphere A inside the bearing is replaced with the atmosphere At having a predetermined composition, and the pressure inside the bearing is adjusted to the predetermined atmospheric pressure Pt.

Figure 7:
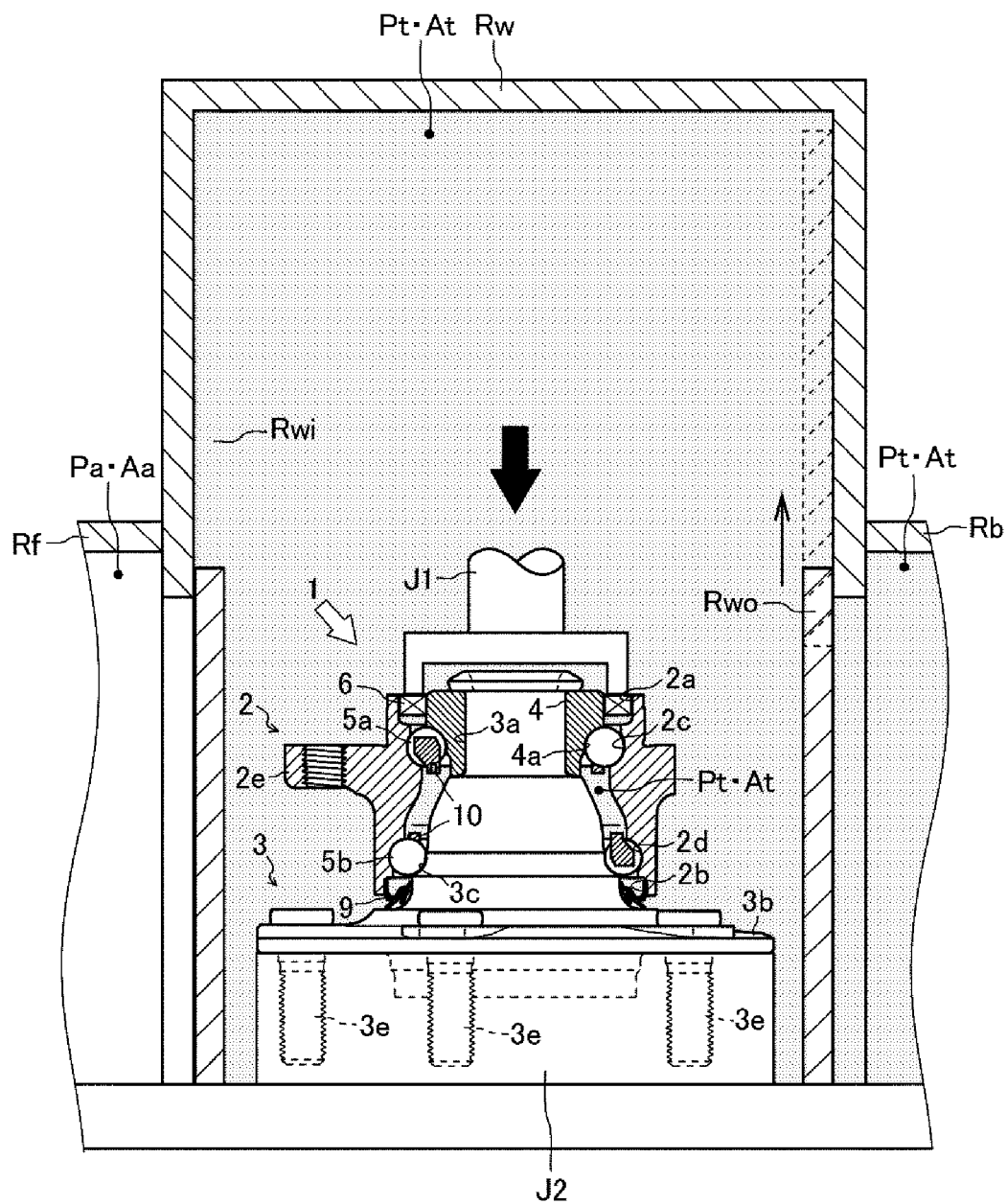
FIG. 7 is a schematic cross-sectional view showing a state in which a seal member is fitted to a bearing device for a vehicle wheel in the work chamber in the device for manufacturing the bearing device for a vehicle wheel.

As illustrated in FIG. 7, the sealing step in the manufacturing method of the bearing device for a vehicle wheel 1 is a step of sealing the inner-side opening portion 2a in the work chamber Rw. In the sealing step, the inner-side seal member 6 is supplied from the seal member supply device to the bearing device for a vehicle wheel 1 in the work chamber Rw while being held by the holder J2. In the bearing device for a vehicle wheel 1, the supplied inner-side seal member 6 is fitted into the inner-side opening portion 2a from the axially upper side by the seal member press-fitting jig J1 (see a thick black arrow). In this manner, in the bearing device for a vehicle wheel 1, the space inside the bearing is sealed by the inner-side seal member 6 and the outer-side seal member 9. In the bearing device for a vehicle wheel 1, the space inside the bearing is filled with the atmosphere At having a predetermined composition and is maintained in a state of the predetermined atmospheric pressure Pt.

Figure 8:
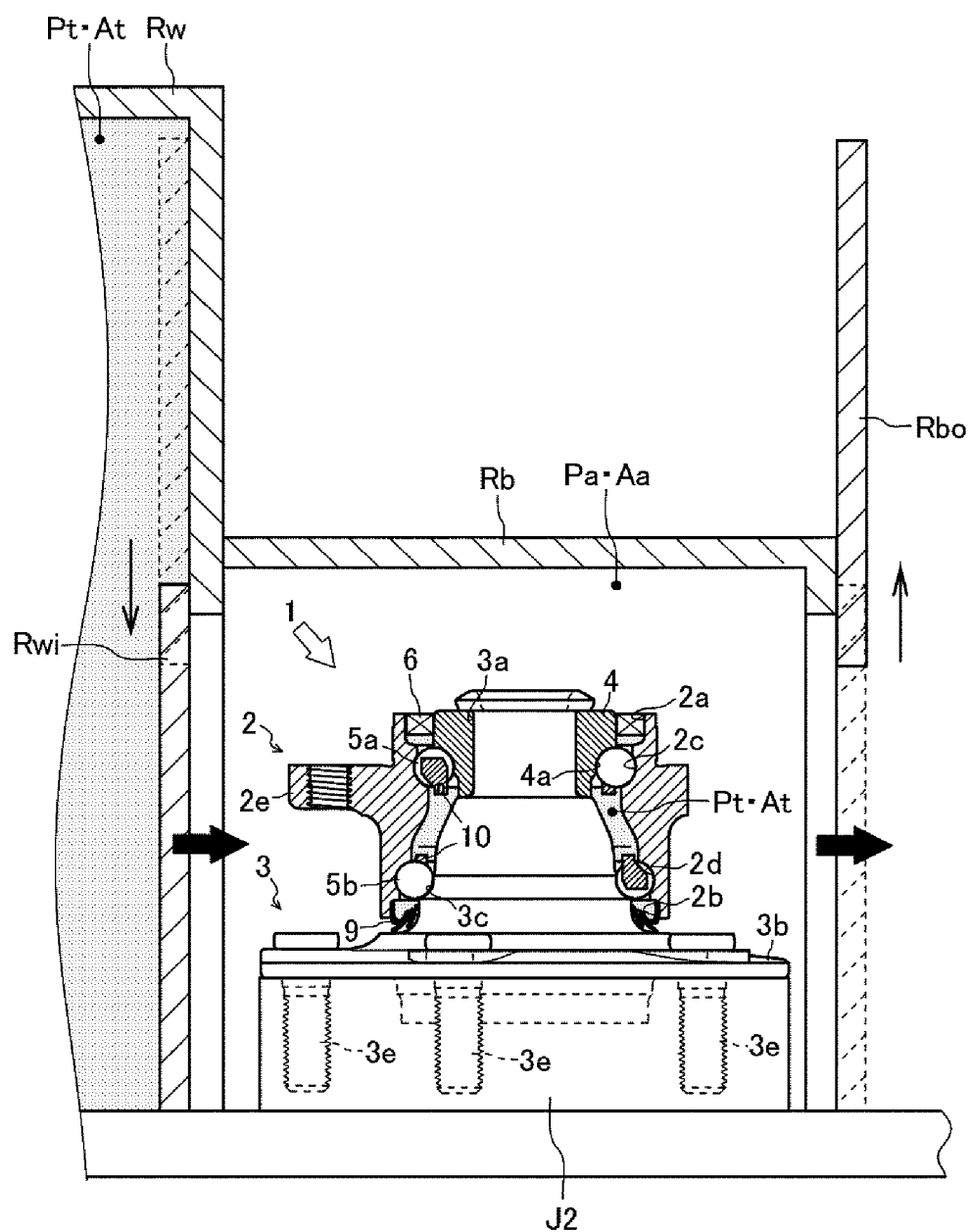
FIG. 8 is a schematic cross-sectional view showing a state in which a rear chamber that seals a bearing device for a vehicle wheel is exposed to the atmosphere in the device for manufacturing the bearing device for a vehicle wheel.

As illustrated in FIG. 8, the atmosphere releasing step in the manufacturing method of the bearing device for a vehicle wheel 1 is a step of releasing the rear chamber Rb in which the bearing device for a vehicle wheel 1 is enclosed into the atmosphere. In the atmosphere releasing step, the bearing device for a vehicle wheel 1 is moved from the discharge portion Rwo of the work chamber Rw into the rear chamber Rb while being held by the holder J2 (see a thick black arrow). The rear chamber Rb communicates with the work chamber Rw as the discharge portion Rwo of the work chamber Rw is opened. At this time, since the composition of the atmosphere and the atmospheric pressure in the rear chamber Rb are equal to the composition of the atmosphere and the atmospheric pressure in the work chamber Rw, the composition of the atmosphere and the atmospheric pressure in the work chamber Rw do not change even if the discharge portion Rwo is opened. The bearing device for a vehicle wheel 1 is enclosed in the rear chamber Rb as the discharge portion Rwo of the work chamber Rw is closed (see an arrow). The rear chamber Rb enclosing the bearing device for a vehicle wheel 1 is released to the atmosphere as the rear chamber discharge portion Rbo is opened (see an arrow). The bearing device for a vehicle wheel 1 is discharged to the outside from the rear chamber discharge portion Rbo.

Figure 9:
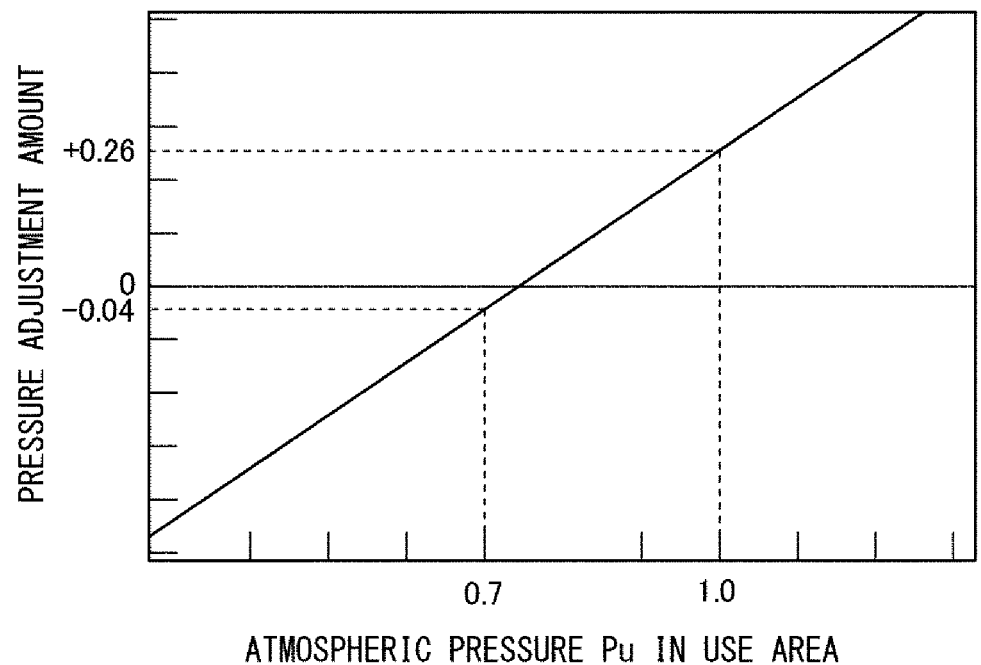
FIG. 9 is a graph showing a pressure adjustment amount for each atmospheric pressure in a use area of a bearing device for a vehicle wheel in a pressure adjusting step in a manufacturing method of the bearing device for a vehicle wheel.

Next, the setting of the atmospheric pressure P inside the bearing of the bearing device for a vehicle wheel 1 will be specifically described with reference to FIG. 9. FIG. 9 is a graph showing a pressure adjustment amount of the atmospheric pressure P inside the bearing for each atmospheric pressure Pu in the use area in a case where the bearing device for a vehicle wheel 1 is assembled in an area at an altitude of 1500 m where the atmospheric pressure is 0.84 atm. In the present embodiment, in the bearing device for a vehicle wheel 1, the atmospheric pressure P inside the bearing is set to an atmospheric pressure higher by 0.1 atm than the atmospheric pressure Pu in the use area so that the generation of a force of pressing the seal lips of the inner-side seal member 6 and the outer-side seal member 9 against the sliding surface and a force of separating the seal lips from the sliding surface during use. (At this time, a pressure change due to a temperature change caused by the altitude difference is also considered.)

As illustrated in FIG. 9, in a case where the bearing device for a vehicle wheel 1 is mounted on a vehicle traveling in an area, for example, at an altitude of 0 m where the atmospheric pressure is 1.0 atm, the atmospheric pressure Pa (0.84 atm) of the area where the bearing device for a vehicle wheel 1 is assembled is lower than the atmospheric pressure Pu (1.0 atm) of the use area. Therefore, the bearing device for a vehicle wheel 1 needs to be assembled so that the atmospheric pressure P inside the bearing becomes the predetermined atmospheric pressure Pt (1.1 atm) which is higher by 0.1 atm than the atmospheric pressure Pu of the use area in the preliminary pressure adjusting step, the pressure adjusting step, and the sealing step. Therefore, in the preliminary pressure adjusting step and the pressure adjusting step, the bearing device for a vehicle wheel 1 is pressurized (has pressure adjusted) by 0.26 atm so that the atmospheric pressure P inside the bearing becomes an atmospheric pressure higher than the atmospheric pressure Pa of the area where the bearing device for a vehicle wheel 1 is assembled.

In a case where the bearing device for a vehicle wheel 1 is mounted on a vehicle traveling in an area at an altitude of 3000 m where the atmospheric pressure is 0.70 atm, for example, the atmospheric pressure Pa (0.84 atm) of the area where the bearing device for a vehicle wheel 1 is assembled is higher than the atmospheric pressure Pu (0.70 atm) of the use area. Therefore, the bearing device for a vehicle wheel 1 needs to be assembled so that the atmospheric pressure P inside the bearing becomes the predetermined atmospheric pressure Pt (0.80 atm) which is higher by 0.1 atm than the atmospheric pressure Pu of the use area in the preliminary pressure adjusting step, the pressure adjusting step, and the sealing step. Therefore, in the preliminary pressure adjusting step and the pressure adjusting step, the bearing device for a vehicle wheel 1 has pressure reduced (adjusted) by 0.04 atm so that the atmospheric pressure P inside the bearing becomes an atmospheric pressure lower than the atmospheric pressure Pa of the area where the bearing device for a vehicle wheel 1 is assembled.

With such a configuration, in the bearing device for a vehicle wheel 1, the atmospheric pressure P inside the bearing is adjusted in the preliminary pressure adjusting step and the pressure adjusting step, and the atmospheric pressure P inside the bearing is maintained in the sealing step. In this manner, the bearing device for a vehicle wheel 1 can suppress the pressure difference between the atmospheric pressure P inside the bearing and the atmospheric pressure Pu in the use area within the allowable range, and prevent an increase in the rotational torque caused by attachment of the seal lip due to the pressure difference. Further, the bearing device for a vehicle wheel 1 can also prevent wear of the seal lip while suppressing oxidation, dew condensation, oxidation of the lubricant, and the like inside the bearing. Further, in the bearing device for a vehicle wheel 1, the atmospheric pressure P inside the bearing is set to the predetermined atmospheric pressure Pt based on the atmospheric pressure Pu of the use area of the bearing device for a vehicle wheel 1 without changing of the entire size and structure. Further, in the bearing device for a vehicle wheel 1, an atmosphere state inside the bearing is stabilized as the space inside the bearing is filled with atmosphere having a predetermined composition and state.

The bearing devices for a vehicle wheel 1 and 11 in the present application include the outer ring 2 as the outer member and the hub ring 3, to which one of the inner ring 4 is fitted, as the inner member, and is a bearing device for a vehicle wheel (driven wheel type) having a third-generation structure of inner-ring rotation specification composed of the outer ring 2 and a fitting body of the inner ring 4 and the hub ring 3. However, a bearing device for a vehicle wheel having a first-generation structure with no mounting flange, a bearing device for a vehicle wheel having a second-generation structure of an outer-ring rotation or inner-ring rotation type, a bearing device for a vehicle wheel having a third-generation structure of a driving wheel type, or a bearing device for a vehicle wheel having a fourth generation structure in which a bearing inner member and an outer ring of a constant velocity universal joint are integrated may be employed, as long as the bearing device for a vehicle wheel is composed of the outer member and the inner member, in which an opening portion of the bearing device for a vehicle wheel is sealed by the seal member which is a sealing member or a cover. Further, the bearing device is not limited to be used for a wheel, as long as the bearing device includes the outer member and the inner member, and an opening portion of the bearing device is sealed with the seal member or the cover. Similarly, the manufacturing method of the present application is not limited to the bearing device as long as a change in the internal pressure is a problem.

Although the embodiments of the present invention are described above, the present invention is not limited to such embodiments in any way, and the embodiments are merely an example. As a matter of course, the present invention can be implemented in various forms without departing from the gist of the present invention. The scope of the present invention is indicated by the description of the claims, and further includes the equivalent meaning to and all changes within the scope of the claims.

INDUSTRIAL APPLICABILITY

The present invention is applicable to a manufacturing method of a bearing device for a vehicle wheel and a bearing device for a vehicle wheel.

REFERENCE SIGNS LIST 1 bearing device for a vehicle wheel
2 outer ring
2a inner-side opening portion
3 hub ring
4 inner ring
6 inner-side seal member
9 outer-side seal member
Rw work chamber

The invention claimed is:

1. A manufacturing method of a bearing device for a vehicle wheel, the bearing device for a vehicle wheel including:
an outer member having a plurality of rows of outer raceway surfaces formed on an inner periphery;

an inner member on which a plurality of rows of inner raceway surfaces facing the plurality of rows of outer raceway surfaces are formed;

a plurality of rows of rolling bodies rollably accommodated between both the outer raceway surfaces of the outer member and the inner raceway surfaces of the inner member; and a first sealing member to be fitted into an opening portion on an outer side of the outer member and a second sealing member to be fitted into an opening portion on an inner side of the outer member, the manufacturing method comprising:

a pressure adjusting step of enclosing, in a work chamber, the bearing device for a vehicle wheel to which one of the first sealing member on the outer side or the second sealing member on the inner side is fitted, the work chamber being provided for adjusting an atmospheric pressure in the work chamber, and adjusting a pressure in the work chamber to a predetermined atmospheric pressure according to an environment of a use area of the bearing device for a vehicle wheel; and a sealing step of fitting another of the first sealing member or the second sealing member to an opening portion on a side of the outer member where the one of the first sealing member or the second sealing member is not fitted in the work chamber in which the pressure has been adjusted, wherein, in the pressure adjusting step, the pressure is adjusted after an atmosphere in the work chamber is replaced with an atmosphere having a predetermined composition.

2. The manufacturing method of a bearing device for a vehicle wheel according to claim 1, wherein the atmosphere having the predetermined composition has a predetermined humidity or a predetermined nitrogen concentration.

3. The manufacturing method of a bearing device for a vehicle wheel according to claim 1, further comprising:

a preliminary pressure adjusting step of, before the pressure adjusting step, using a front chamber communicating with the work chamber by adjusting an internal atmospheric pressure, enclosing the bearing device for a vehicle wheel in which the one of the first sealing member on the outer side or the second sealing member on the inner side is fitted in the front chamber, and moving the bearing device for a vehicle wheel to the work chamber after a pressure in the front chamber is adjusted to the predetermined atmospheric pressure; and an atmosphere releasing step of, subsequent to the sealing step, using a rear chamber communicating with the work chamber by adjusting an internal atmospheric pressure, moving the bearing device for a vehicle wheel from the work chamber to the rear chamber after adjusting a pressure in the rear chamber to the predetermined atmospheric pressure, and releasing the rear chamber to atmosphere after enclosing the bearing device for a vehicle wheel in the rear chamber.

4. The manufacturing method of a bearing device for a vehicle wheel according to claim 3, wherein, in the preliminary pressure adjusting step and the atmosphere releasing step, the pressure is adjusted after an atmosphere of the front chamber and the rear chamber is replaced with an atmosphere having a same composition as that of the work chamber.

* * * * *